United States Patent
Norwich

(10) Patent No.: US 10,844,940 B2
(45) Date of Patent: Nov. 24, 2020

(54) TORQUE CONVERTER WITH CHARGE PRESSURE COMPENSATION

(71) Applicant: SCHAEFFLER TECHNOLOGIES AG & CO. KG, Herzogenaurach (DE)

(72) Inventor: Victor Norwich, Wooster, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 119 days.

(21) Appl. No.: 16/122,206

(22) Filed: Sep. 5, 2018

(65) Prior Publication Data

US 2020/0072332 A1 Mar. 5, 2020

(51) Int. Cl.
- *F16H 45/02* (2006.01)
- *F16H 61/14* (2006.01)
- *F16H 61/30* (2006.01)

(52) U.S. Cl.
CPC ........... *F16H 45/02* (2013.01); *F16H 61/148* (2013.01); *F16H 61/30* (2013.01)

(58) Field of Classification Search
CPC ............ F16D 45/02; F16D 2045/0205; F16D 2054/021; F16D 2045/0221; F16D 2045/0236; F16D 2045/0242; F16H 61/148

See application file for complete search history.

(56) References Cited

U.S. PATENT DOCUMENTS

| | | |
|---|---|---|
| 2004/0050640 A1 | 3/2004 | Schmid |
| 2006/0124420 A1* | 6/2006 | Ackermann ............ F16H 45/02 192/3.29 |
| 2011/0005880 A1* | 1/2011 | Carrier .................... F16H 45/02 192/3.29 |
| 2011/0114433 A1* | 5/2011 | Hattori .................... F16H 45/02 192/3.29 |
| 2013/0256075 A1* | 10/2013 | Walker ................... F16H 41/24 192/3.29 |

(Continued)

FOREIGN PATENT DOCUMENTS

| | | |
|---|---|---|
| EP | 0769639 A2 | 4/1997 |
| JP | 2000320642 A | 11/2000 |

(Continued)

OTHER PUBLICATIONS

Collin's Definition of "Plate", retrieved from www.collinsdictionary.com (Year: 2020).*

(Continued)

*Primary Examiner* — Stacey A Fluhart

(57) ABSTRACT

A torque converter includes a front cover configured to receive an input torque, and an impeller having an outer shell coupled to the front cover. A clutch is selectively engageable by a piston. A cover compensator is located axially between the front cover and the piston. The cover compensator is configured to reduce deflection of the front cover in the event of high pressures when changing gears in the transmission. The cover compensator has a radially-innermost sealing surface configured to engage and seal with a transmission input shaft. The cover compensator may also has an aperture to fluidly couple fluid chambers located on either axial side of the cover compensator. This can allow fluid to be forced through the clutch to continuously lubricate the clutch.

17 Claims, 1 Drawing Sheet

(56) References Cited

U.S. PATENT DOCUMENTS

| | | | | |
|---|---|---|---|---|
| 2014/0251746 A1* | 9/2014 | Ito | ............ | F16F 15/134 |
| | | | | 192/70.11 |
| 2014/0326563 A1* | 11/2014 | Ushio | ............ | F16H 45/02 |
| | | | | 192/3.28 |
| 2015/0198227 A1* | 7/2015 | Blough | ............ | F16H 45/02 |
| | | | | 192/3.26 |
| 2017/0108076 A1* | 4/2017 | Watanabe | ............ | F16F 15/1202 |
| 2017/0254398 A1* | 9/2017 | Watanabe | ............ | F16F 15/1457 |
| 2018/0202514 A1* | 7/2018 | Yang | ............ | F16F 15/1215 |

FOREIGN PATENT DOCUMENTS

| | | | |
|---|---|---|---|
| JP | 2004162828 A | 6/2004 | |
| JP | 2014025492 A | 2/2014 | |

OTHER PUBLICATIONS

Cambridge's Definition of "Plate", retrieved from dictionary.cambridge.org (Year: 2020).*

MacMillan's Definition of "Plate", retrieved from www.macmillanthesaurus.com (Year: 2020).*

* cited by examiner

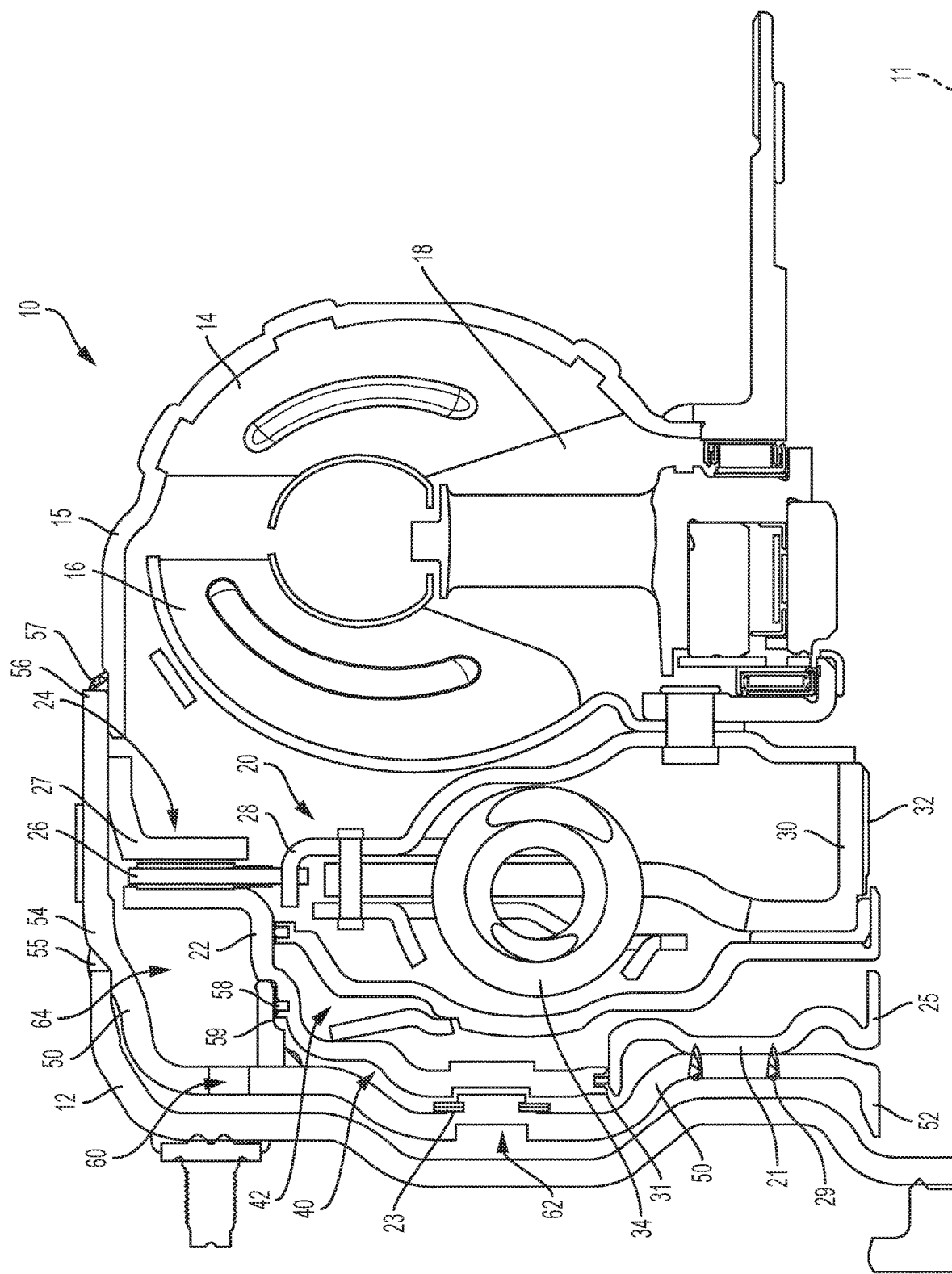

TORQUE CONVERTER WITH CHARGE PRESSURE COMPENSATION

TECHNICAL FIELD

The present disclosure relates to a torque converter for a vehicle with an automatic transmission. In particular, the torque converter is provided with structure to compensate charge pressure in the torque converter that may arise during a gear change.

BACKGROUND

Automotive vehicles with automatic transmissions are known to be equipped with a torque converter. The torque converter is a fluid coupling which can transfer rotating power from an engine to an automatic transmission. Torque converters typically include a front cover fixed to an impeller, which rotate as a unit to transfer fluid through the torque converter.

SUMMARY

In one embodiment, a torque converter incluers a front cover configured to receive an input torque, and an impeller having an outer shell non-rotatably connected to the front cover. A cover compensator is disposed axially between the front cover and the impeller. The cover compensator has an inner portion configured to seal against a transmission input shaft, and an outer portion directly connected to and between the front cover and the outer shell of the impeller.

In another embodiment, a torque converter includes a front cover configured to receive an input torque, and an impeller having an outer shell coupled to the front cover. A clutch is selectively engageable by a piston. A cover compensator is located axially between the front cover and the piston. The cover compensator has a radially-innermost sealing surface configured to engage and seal with a transmission input shaft. The cover compensator has an aperture to fluidly couple fluid chambers located on either axial side of the cover compensator.

In another embodiment, a torque converter has a front cover rotatable about an axis, and a cover compensator non-rotatably fixed to the front cover. The cover compensator has an inner surface configured to seal against an input shaft of a transmission. A first fluid chamber is defined axially between the front cover and the cover compensator. A piston is configured to slide axially to engage a clutch. A second fluid chamber is defined axially between the cover compensator and the piston.

BRIEF DESCRIPTION OF THE DRAWINGS

FIG. 1 is a cross-sectional view of a torque converter having a cover compensator, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a portion of a torque converter 10 is illustrated according to one embodiment. At least some portions of the torque converter 10 are rotatable about a central axis 11. While only a portion above the axis is shown in FIG. 1, it should be understood that the torque converter can appear substantially similar below the axis with many components extending about the axis. Words such as "axial," "radial," "circumferential," "outward," etc. as used herein are intended to be with respect to the central axis 11. Power from a vehicle engine (not shown) can be transmitted to a transmission via fluid, and via the torque converter. In particular, the power may first be transmitted to a front cover 12 of the torque converter 10. The torque converter 10 also includes a pump or impeller 14 with an outer shell or impeller shell 15 non-rotatably connected to the front cover 12 such that the impeller 14 rotates as the front cover 12 rotates. As will be described below, while typical torque converters have a direct integral connection between the impeller 14 and the front cover 12, this disclosure provides a cover compensator 50 between the front cover 12 and the impeller 14; it can therefore be said that the front cover 12 and the impeller 14 are indirectly connected to each other via the cover compensator 50. The torque converter also includes a turbine 16, a stator 18, and a vibration damper 20 for hydraulically transferring torque through the torque converter. These components are shown as examples of components of the torque converter, and in other embodiments could be replaced by any type or style of cover, impeller, turbine, stator, and/or vibration damper known in the art, and in some embodiments, some of these components may not even be included.

The impeller 14 includes blades that, when rotated about the axis 11, push the fluid outwardly. The fluid pushes against the turbine 16 of the torque converter 10, causing the turbine 16 to revolve about the axis 11. The stator 18 functions to return the fluid from the turbine 16 back to the impeller 14 with minimal or no power loss. Drive power is transmitted from the turbine 16 to an input shaft of the transmission (not shown).

The torque converter 10 includes a piston 22. As will be described below, the torque converter 10 includes a cover compensator 50 disposed axially between the cover 12 and the piston 22. The piston 22 is connected to the cover compensator 50 via springs 23 (e.g., leaf springs). Springs 23 are but one of a plurality of possible connections between the piston 22 and the cover compensator 50. The piston 22 engages clutch 24 in response to the pressurization of a medium (e.g., fluid such as oil) in various chambers of the torque converter (e.g., piston apply chamber 40 and fluid compensation chamber 42) on opposite axial sides of the piston 22. For example, in one embodiment, an increase in fluid pressure within the piston apply chamber 40 moves the piston 22 toward the clutch 24, which increases a compressive force on the clutch 24, causing the clutch 24 to engage. A decrease in fluid pressure within the piston apply chamber 40 allows the piston 22 to move away from the clutch 24, which decreases the compressive force on the clutch 24, causing the clutch 24 to disengage. During axial movement of the piston 22, the piston 22 slides along a cover centering plate 21 that is non-rotatably fixed to the cover compensator 50 via, for example, welds 29. A seal 31 maintains a fluid separation between the chambers 40, 42 while the piston 22 slides along the cover centering plate 21.

The clutch 24 is a lock-up clutch configured to mechanically couple the transmission input shaft to the cover 12 with a purely mechanical coupling, resulting in no slippage and virtually no power loss. In one embodiment, the clutch 24 includes a clutch plate 26 which is rotationally fixed to a cover plate 28 of the vibration damper 20, and selectively engageable between the piston 22 and a clutch reaction plate 27 fixed with respect to the cover 12.

In the illustrated embodiment, the piston 22 and a flange 30 of the damper 20 are directly engaged with the transmission input shaft. The piston 22 is sealed against the shaft at an axially-extending portion that defines a cover centering plate bore 25, while the flange 30 is engaged with the shaft via a splined connection at 32. In one embodiment, the flange 30 may be part of a hub separately connected about the transmission input shaft.

The damper 20 includes at least one spring 34. When the clutch 24 is locked or closed, torque is transmitted from cover 12 and cover compensator 50 to the cover plate 28, which transmits the torque through the spring 34, through the flange 30 and into the transmission input shaft at splined connection 32.

The transmission or gearbox (not shown) may be an automatic transmission. In typical torque converters, when the transmission is commanded to change gears, the charge pressure in the chambers (e.g., piston apply chamber) can increase significantly. This can in turn cause the torque converter's cover to deflect, changing the volume of the apply chamber. When this happens, the pressure in the apply chamber is affected, which can cause unpredictable torque passing through the torque converter.

Therefore, according to various embodiments described herein and as briefly alluded to above, the torque converter of the present disclosure includes a cover compensator 50. The cover compensator 50 is or includes an additional plate located axially between the cover 12 and the piston 22. The piston apply chamber 40 is therefore located axially between the cover compensator 50 and the piston 22. The cover compensator 50 fully compensates the charge pressure and rotational pressures when changing gears, insulating the cover 12 from deflection. As can be seen in FIG. 1, the chambers on either axial side of the cover compensator 50 are fluidly connected so that pressures on either side of the cover compensator 50 are identical. This minimizes or eliminates deflection of the cover compensator 50 with respect to the piston 22 during changes in charge pressure.

In the illustrated embodiment, the cover compensator 50 includes a radially inward surface defining a sealing surface 52 that contacts the transmission input shaft. The transmission input shaft may have a formed groove or surface feature configured to receive or engage the sealing surface 52 to create the seal. At a radially outer end, the cover compensator 50 includes a first portion 54 engaged with the front cover 12 (e.g., via a weld at 55), and a second portion 56 engaged with the impeller shell 15 of the impeller 14 (e.g., via a weld at 57). The cover compensator 50 can be a separate component than the cover 12, axially separated from the cover 12 at all portions other than the weld at 55.

The cover compensator 50, the front cover 12, and the impeller shell 15 can all be fixedly connected to one another to take the form of a single component. As can be seen in FIG. 1, the radially-outer-most part of the entire torque converter 10 and dampener assembly can include part of the cover 12, part of the cover compensator 50, and part of the impeller shell 15. However, in other embodiments, the cover 12 is welded directly to the impeller shell 15, and the cover compensator is connected to an inner surface of the cover 12 and does not make up part of the radially-outer-most part of the torque converter and dampener assembly.

As the apply chamber 40 is pressurized, fluid causes the piston 22 to move axially relative to the cover compensator 50 and along the cover centering plate 21. During such movement, a seal 58 slides along an inwardly-facing surface of an axially-extending seal plate 59 that extends axially from the cover compensator 50. As the piston 22 is moved axially in response to the hydraulic pressure (e.g., to the right in the view shown in FIG. 1), the clutch 24 becomes at least partially or fully engaged.

Being located axially between the cover 12 and the piston 22, the cover compensator 50 is able to fully compensate the charge pressures and rotational pressures as a gear change occurs. This additional layer of material reduces potential shock that may otherwise cause deflection of the cover 12 during these times.

The cover compensator 50 also includes one or more apertures or flow holes 60 to fluidly communicate either axial side of the cover compensator 50. This fluidly couples the portions of the torque converter to maintain a pressure equilibrium just outside the pressure apply chamber 40. In particular, a charge pressure chamber 62 between the cover 12 and the cover compensator 50 is fluidly coupled to a fluid chamber 64 directly axially aligned with the clutch 24. The charge pressure chamber 62 also extends into region where the damper 20 resides. This forces fluid through the clutch 24 during fluid circulation, improving the cooling of the clutch. The forced cooling flow is accomplished by adding the additional sealing surface 52 of the cover compensator 50, and removing holes in the clutch reaction plate 27 that might otherwise be provided with the lack of a cover compensator 50.

According to one embodiment, the cover compensator 50 surrounds both the apply chamber 40 and the compensation chamber 42 with other chambers which have fluid pressure in them. In a four-pass torque converter, this splits the function of the 4-pass cover into two different components. In doing this, the cover compensator 50 which supports the clutch chambers no longer has as much deflection due to variation in charge pressure, improving the clutch control during dynamic charge pressure events.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the FIGURES. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

- 10 torque converter
- 12 front cover
- 14 impeller
- 15 impeller shell
- 16 turbine
- 18 stator
- 20 vibration damper
- 21 cover centering plate
- 22 piston
- 23 spring
- 24 clutch
- 25 cover centering plate bore
- 26 clutch plate
- 27 clutch reaction plate
- 28 cover plate
- 29 welds
- 30 flange
- 32 spline connection
- 34 spring
- 40 piston apply chamber
- 42 compensation chamber
- 50 cover compensator
- 52 sealing surface
- 54 first portion of cover compensator
- 55 weld
- 56 second portion of cover compensator
- 57 weld
- 58 seal
- 59 seal plate
- 60 flow hole
- 62 charge pressure chamber
- 64 fluid chamber

What is claimed is:

1. A torque converter comprising:
a front cover configured to receive an input torque;
an impeller having an outer shell non-rotatably connected to the front cover;
a cover compensator plate disposed axially between the front cover and the impeller, the cover compensator plate having an inner portion configured to seal against a transmission input shaft, and an outer portion directly connected to and between the front cover and the outer shell of the impeller; and
a clutch selectively engageable by a piston, and a cover centering plate that includes a radially-innermost surface configured to seal against the transmission input shaft, wherein the piston slides axially along the cover centering plate during actuation of the clutch.

2. The torque converter of claim 1, wherein the torque converter has an outer surface defined at least in part by a radially outer-most surface of the front cover, a radially outer-most surface of the outer shell of the impeller, and a radially outer-most surface of the cover compensator plate.

3. The torque converter of claim 1, wherein the cover centering plate is non-rotatably fixed with the cover compensator plate.

4. The torque converter of claim 1, wherein the cover compensator plate includes a first fluid chamber bound axially between the front cover and the cover compensator plate, and a second fluid chamber bound axially between the cover compensator plate and the clutch.

5. The torque converter of claim 4, wherein the cover compensator plate includes an aperture fluidly coupling the first fluid chamber with the second fluid chamber.

6. The torque converter of claim 5, wherein fluid traveling between the front cover and the cover compensator plate is forced via fluid pressure to travel through the clutch.

7. A torque converter comprising:
a front cover configured to receive an input torque;
an impeller having an outer shell coupled to the front cover;
a clutch selectively engageable by a piston; and
a cover compensator plate located axially between the front cover and the piston, the cover compensator plate having a radially-innermost sealing surface configured to engage and seal with a transmission input shaft, the cover compensator plate further including an aperture to fluidly couple fluid chambers located on either axial side of the cover compensator plate;
wherein the aperture is axially aligned with the clutch.

8. The torque converter of claim 7, wherein the front cover directly contacts and connects to the outer shell of the impeller.

9. The torque converter of claim 7, wherein the cover compensator plate axially separates the front cover and the outer shell of the impeller such that the front cover does not directly connect to the outer shell.

10. The torque converter of claim 7, further comprising a cover centering plate having a radially-innermost surface configured to seal against the transmission input shaft, wherein the piston slides axially along the cover centering plate during actuation of the clutch.

11. The torque converter of claim 10, wherein the cover centering plate is fixed to the cover compensator plate.

12. The torque converter of claim 7, wherein the cover compensator plate includes a first fluid chamber bound axially between the front cover and the cover compensator plate, and a second fluid chamber bound axially between the cover compensator plate and the clutch.

13. The torque converter of claim 12, wherein fluid traveling between the front cover and the cover compensator plate is forced via fluid pressure to travel through the clutch.

14. A torque converter comprising:
a front cover rotatable about an axis;
a cover compensator plate non-rotatably fixed to the front cover, the cover compensator plate having an inner surface configured to seal against an input shaft of a transmission;
a first fluid chamber defined axially between the front cover and the cover compensator plate;
a piston configured to slide axially to engage a clutch;
a second fluid chamber defined axially between the cover compensator plate and the piston; and
a third fluid chamber defined axially between the cover compensator plate and the clutch.

15. The torque converter of claim 14, wherein the cover compensator plate includes an aperture that fluidly connects the first fluid chamber to the third fluid chamber.

16. The torque converter of claim 14, further comprising a cover centering plate non-rotatably fixed to the cover compensator plate, the cover centering plate having an axially-extending outer surface, wherein the piston slides along the axially-extending outer surface during engagement of the clutch.

17. The torque converter of claim 16, wherein the cover centering plate has an axially-extending inner surface configured to seal against the input shaft.

\* \* \* \* \*